J. ARNOTT.
MECHANICAL MOVEMENT.
APPLICATION FILED MAY 9, 1917.
1,342,887.
Patented June 8, 1920.
2 SHEETS—SHEET 1.
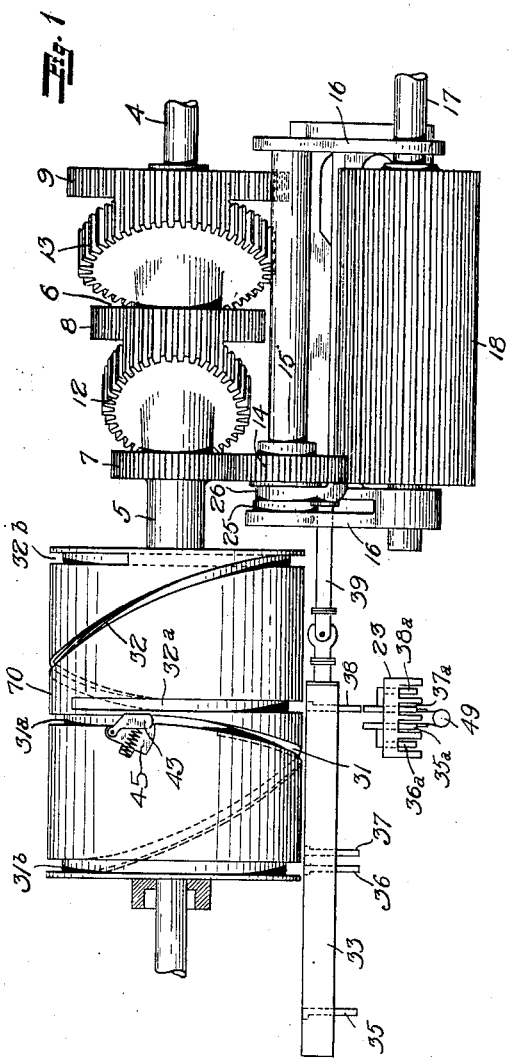
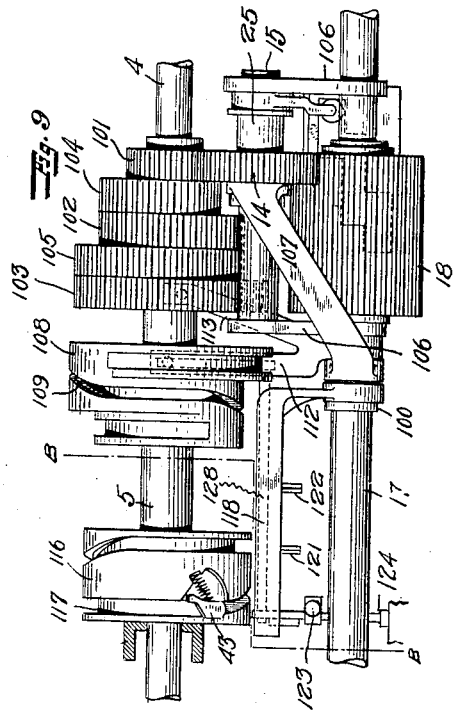
INVENTOR
JAMES ARNOTT
BY White & Prest
HIS ATTORNEYS

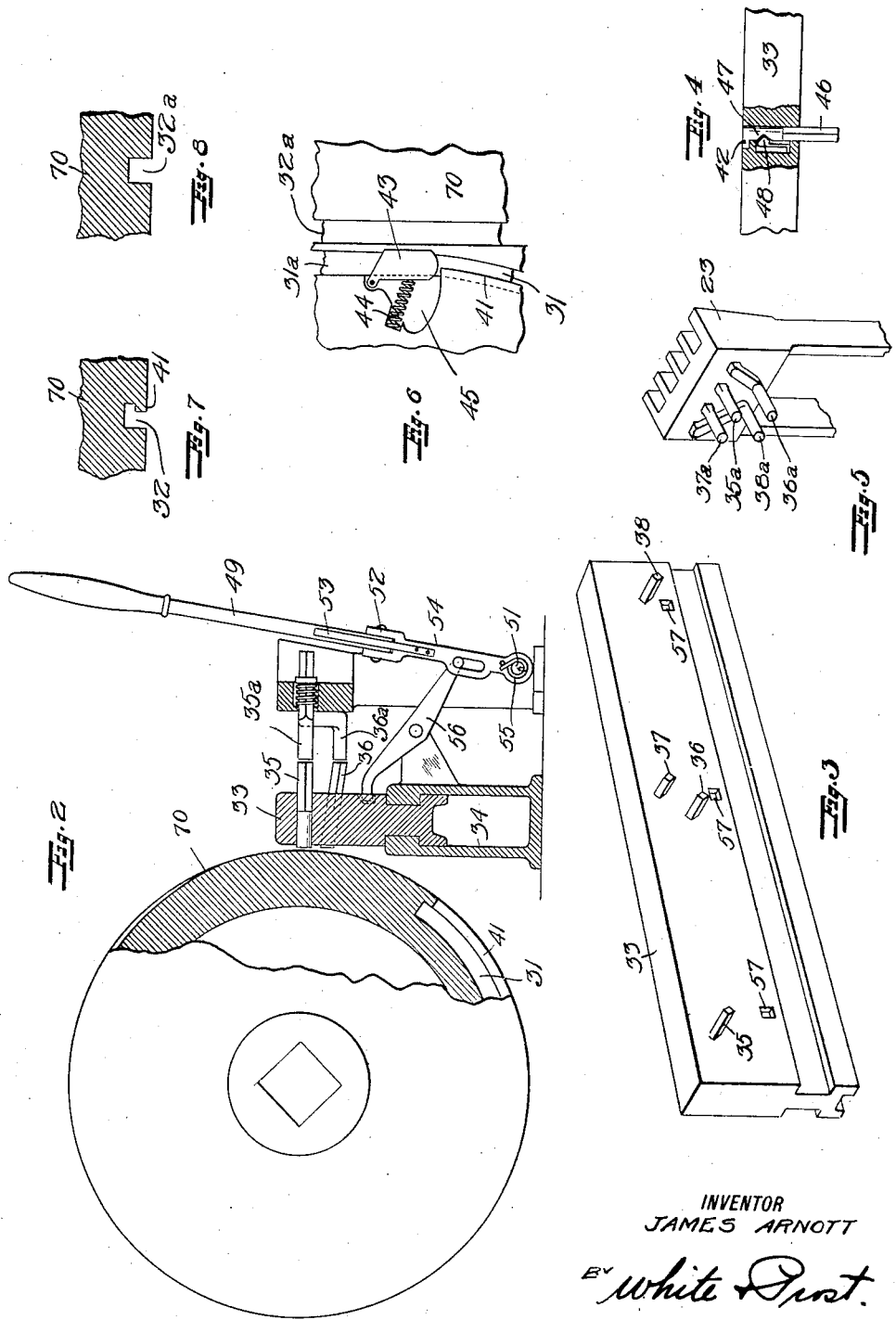

UNITED STATES PATENT OFFICE.

JAMES ARNOTT, OF OAKLAND, CALIFORNIA.

MECHANICAL MOVEMENT.

1,342,887.     Specification of Letters Patent.     Patented June 8, 1920.

Application filed May 9, 1917. Serial No. 167,432.

*To all whom it may concern:*

Be it known that I, JAMES ARNOTT, a citizen of the United States, and a resident of Oakland, county of Alameda, and State of California, have invented a certain new and useful Mechanical Movement, of which the following is a specification.

The invention relates to mechanism for producing certain mechanical movements, and is capable of general use.

This application is a continuation in part of the subject matter which is common to my application Serial No. 843,628, filed in the United States Patent Office on June 8th, 1914, and relates particularly to the cam mechanism disclosed therein.

An object of the invention is to provide a mechanism for producing the movement of a part in time with the progression of another part.

Another object of the invention is to provide means for insuring the proper engagement of a cam and its coöperating parts.

Another object of the invention is to provide means for preventing the disengagement of the cam and its coöperating parts, except at the proper time.

The invention possesses other advantageous features, some of which, with the foregoing, will be set forth at length in the following description, where I shall outline in full that form of the invention which I have selected for illustration in the drawings accompanying and forming part of the present specification. In the drawings, I have shown one specific form of my invention and a modification thereof, but it is to be understood that the invention as expressed in the claims may be embodied in a plurality of forms. In the original application, of which this application is a continuation in part, I have shown a variable speed mechanism and in the present application I have shown the mechanical movement in combination with a variable speed mechanism, but it is to be understood that the device of this application is capable of general use and is not limited in any way to variable speed mechanisms, although it is particularly applicable to such use.

Referring to the drawings:

Figure 1 is a plan or top view of one form of mechanism of my invention associated with a variable speed mechanism, sufficient of the variable speed mechanism being shown to illustrate the operation of the apparatus.

Fig. 2 is an end elevation, partly in section, of the cam, the slide carrying the cam engaging pins and the means for moving the pins into engagement with the cam.

Fig. 3 is a perspective view of the pin-carrying slide.

Fig. 4 is a sectional detail showing the position of the pin in the slide.

Fig. 5 is a perspective view of the pin-selecting and actuating device.

Fig. 6 is a plan of a fragment of the face of the cam showing the means for preventing improper seating of the pin.

Fig. 7 is a fragmentary cross section of the cam, showing the groove therein at its spiral portion.

Fig. 8 is a similar cross section showing the groove at its annular portion.

Fig. 9 is a top or plan view of a modified form of cam and associated mechanism.

Fig. 10 is a cross section of the construction shown in Fig. 9, taken on the line B—B, the figure being turned on its side.

The apparatus of the present invention is shown in connection with a variable diameter gear 6, composed of a plurality of cylindrical or concentric gear elements 7, 8 and 9 and spiral or eccentric gear elements 12 and 13, which are interposed between the cylindrical gears, the spiral gears being of such progressive increase or decrease in diameter that each spiral gear forms a continuous ascending or descending gear segment, springing from the side of one cylindrical gear at a given point and merging into the next gear in a direction which is the resultant of a circular movement about the axis of revolution and a longitudinal movement along it. The spiral or eccentric gears 12—13 are complete in circumference and each gear progresses in opposite directions circumferentially from one cylindrical gear to the adjacent cylindrical gear, thereby forming a complete path upward or downward on gear 6, regardless of the direction of rotation of gear 6.

The teeth in the cylindrical gears and the spiral segments are parallel with each other and with the axis of rotation and at the junction of the cylindrical gear and spiral gear the teeth are prolonged or extended, so that at the zone of juncture the teeth are common to both gears. The oppositely directed segments of the spiral gear spring from the cylindrical gear at points spaced apart, so that the spiral gear segments cross each other at the zone of juncture with the cylindrical gear, the outer edge of one segment merging into the cylindrical gear at the point at which the inner edge of the oppositely-directed segment springs from the cylindrical gear.

Engaging the teeth of gear 6 is a connecting gear 14 which is movable longitudinally so that it may be moved into engagement with either of the different diameter cylindrical gears 7, 8 and 9. The connecting gear 14 travels from one cylindrical gear to the next over the spiral segment, either ascending or descending, depending upon the longitudinal direction of movement of the connecting gear. The gear 14 always remains in mesh with gear 6, both when it engages the cylindrical gears, the spiral gears, or is passing from the cylindrical gear to the spiral gear and vice versa. It is understood that the portion of the spiral gear on which the teeth are common to both the spiral and cylindrical gears is cylindrical and that the radius of the spiral gear does not begin to vary until after the spiral gear has completely departed from the cylindrical gear.

The connecting gear 14 is movable laterally as well as longitudinally to compensate for the different and varying diameters of the gear elements forming the composite gear 6. The gear 14 is mounted for rotation on the transversely movable shaft 15, which is supported in the arms 16, which are in turn journaled on the countershaft 17. Secured to the countershaft between the arms 16 is a cylindrical gear 18 with which the connecting gear 14 meshes.

The gear 18 is secured to the shaft 17 which is driven in any suitable manner and power is transferred from gear 18 to the composite gear 6, through the gear 14. The gear 6 is preferably secured to a sleeve 5 which is rotatable on the driven shaft 4, suitable means being provided for connecting it to the driven shaft when desirable. The shafts 15 and 17 are parallel, so that gears 14 and 18 are always properly meshed, regardless of the transverse position of gear 14 with respect to the axis of gear 6. The gear 14 is provided with an annular hub 25, which is rotatably engaged by the arm 26, to which means are attached for moving the gear 14 longitudinally of the composite gear 6, in time with the revolution of the gear 6, so that gear 14 is always maintained continually and properly in mesh with gear 6, both when engaging the cylindrical gear elements and when traveling over the spiral gear elements. This is accomplished by means of the shifting cam 70, secured to the sleeve 5 and rotatable with the composite gear 6. The cam 70 is provided with two helical grooves or actuating surfaces 31—32, the grooves being oppositely directed, so that as the cam revolves, one groove progresses to the right and the other to the left. In the further description I shall assume that the gear 6 and cam 70 rotate normally in a clockwise direction when viewed from the right, that is, that the forward surface of the cam is moving upward. When the direction of movement of the vehicle or other applied apparatus is reversed, the cam will accordingly revolve in a counter-clockwise direction. Under the normal conditions of operation, the groove 32 progresses toward the right and the groove 31 to the left. The grooves are helical, except at their ends where they terminate in circular or "straight" portions $31^a$, $31^b$, $32^a$, $32^b$, and at the straight portions, the bottom of the grooves are eccentric to the axis, so that at the ends the grooves terminate on the circumference of the cam. The straight portions $31^a$, $32^a$, lie adjacent each other at the center of the cam, and the straight portions $31^b$, $32^b$, are disposed at the opposite ends of the cam.

Arranged adjacent the cam 70 is a slide 33 mounted in a fixed frame 34, the slide being provided with pins 35—36—37—38 adapted to be seated in the grooves. It is evident that when the proper pin is moved into engagement with the proper groove, that the slide is moved longitudinally in time with the progression of the groove. The slide is suitably connected with gear 14, so that the gear moves longitudinally in time with the slide, in the construction shown in Fig. 1, the connecting means consisting of a link 39 attached at one end to the slide and at the other end to the arm 26. In the present construction I have shown three cylindrical gears 7, 8 and 9, the helical portion of cam groove 31 serving to move gear 14 from engagement with gear 9 into engagement with gear 8 and from gear 8 into engagement with gear 7, and the helical portion of cam groove 32 serving to move gear 14 from engagement with gear 7 into engagement with gear 8 and from gear 8 into engagement with gear 9. It follows, therefore, that the slide 33 moves to the left of its throw in two equal steps and moves to the right of its throw in two equal steps. Pin 38 moved into engagement with groove $32^a$ moves the slide to the right, the distance between grooves $32^a$ and $32^b$ and is expelled from groove $32^b$ by the eccentric portion thereof, in which the bottom of the groove merges into the face of the cam. Gear 14 is then in mesh with gear 8, and pin 37 registers with groove $32^a$, and pin 36 with groove $31^a$. If the pin 37 is then moved into grove $32^a$, the slide is moved an equal distance to the right, bringing pin 35 into registry with groove 31ª and gear 14 into mesh with gear 9, provided the gear components of gear 6 are correctly placed in relation to the grooves on the cam and that the connecting means between the grooves and gear 14 are properly arranged. In passing gear 14 from gear 9 to gear 8 and from gear 8 to gear 7, the same equal steps are produced by moving pin 35 into groove 31ª and after the step has been completed by moving pin 36 into groove 31ª. The pin is moved into and out of the groove at the straight or circular portions, and is moved longitudinally by contact with the helical groove or actuating surface.

The position of the pins 35—36—37—38 with relation to the grooves 31—32 and the position of gear 14 with relation to the component parts of gear 6 must be such that the gear 14 is moved in time with the spirals 12 and 13 and in proper engagement therewith. Since the gear 14 moves transversely with respect to the axis of gear 6, its position of engagement with the gears 7, 8 and 9 varies, that is, when the gear 14 is in engagement with gear 9 it is elevated and when it is in engagement with gear 7 it is depressed and lies closer to a horizontal plane through the axis of gear 6. For this reason a given point on gear 7 will come into engagement with gear 14 sooner than a corresponding point on gear 9 would. Hence, if the points of juncture of gear 12 and gear 8 were in the same position relative to a plane passing longitudinally through the axis of the gear 6 as the points of juncture of gears 13 and 9 and the pins 35—36 or 37—38 were set in the same position with relation to the position of the cam grooves 31—32, the gear 14 would not mesh properly with gear 12 or 13. This variation, due to the transverse movement of the gear 14, may be overcome by arranging the pins in each pair (pins 35 and 36 constituting one pair and pins 37 and 38 constituting the other pair) at different angular positions with regard to the cam grooves, or by shifting the position of the spiral gear 13 with relation to spiral gear 12. It is understood that the positioning of the spiral gears is determined before the gear 6 is constructed. In the construction shown in Fig. 1 I have shown the point of juncture of gears 9 and 13 set back slightly with respect to the point of juncture of gears 8 and 12, so that the position of the cam grooves will be the same when gear 14 is at the juncture point on gear 8 or 9.

Instead of following this construction, the points of juncture of the cylindrical and spiral gears may be alined, and the pins in the slide 33 may be so arranged that the gear 14 moves in proper mesh and in time with the spiral gears. This may be accomplished by placing pins 36 and 38 at lower levels than pins 35 and 37 respectively, so that they will engage the spiral portion of the cam grooves in advance of the pins 35 and 37, thereby causing the longitudinal movement of gear 14 from gear 8 to gear 9 and vice versa, to be slightly in advance of the movement from gear 8 to gear 7 and vice versa, with relation to the position of the grooves on the cam. This positioning of the pins in the slide is shown in Figs. 2 and 3 the pins being arranged radially with respect to the cam.

The grooves 31—32 are formed at their spiral or actuating portions with an overhanging edge 41 and the pins 35—36—37—38 are provided at their heads with a lateral projection 42 which engages under the overhanging edge and locks the pin in the groove. The base of the groove is of the same width throughout its length and the overhanging edge extends only over the spiral portion of the groove. The thickness of the overhanging edge gradually decreases at the ends of the spiral portion of the groove, the under surface of the edge sloping to the surface of the cam.

The pin is moved into the groove at its straight portion and must be moved sufficiently into the groove at the time that the beginning of the spiral portion approaches so that the pin will not be sheared off or mutilated. The leading end of the pin will probably be sheared off or mutilated if the pin is only partly entered into the groove by the time it is engaged by the actuating surface or spiral portions. Means are employed, therefore, for insuring the proper seating of the pin in the slot before it is engaged by the spiral portion of the groove, and this is accomplished by preventing the entry of the pin into the slot at such time that it would not have sufficient time to be properly seated before it moved into the spiral portion of the groove.

Arranged flush with the surface of the cam 7 and overlying the groove at the juncture of the straight intake portion (31ª, 32ª) with the spiral portion of the groove is a guard plate 43, which is pivoted at one end so that it may be moved from over the groove. The guard plate is normally held in position by a spring 44 and when moved from the groove lies in a cavity or depression 45 in the face of the cam. The guard plate is of such length and is so placed, that if the pin is started into the groove before the guard plate comes around, there is sufficient time for the pin to seat in the groove before the spiral portion of the groove is reached and the pin in the groove moves the guard plate to one side. Should the pin be moved toward the groove after the critical position of entry has passed, it contacts with the surface of the guard plate and is prevented from entering and when the guard plate has moved out from under the pin, the spiral portion of the groove has begun, the pin no longer registers with the groove and cannot be moved into the groove. By this arrangement I insure the movement of the pin into the groove sufficiently in advance of the approach of the spiral portion to allow the pin to become sufficiently seated in the groove so that the leading end thereof will not be sheared off or mutilated by the spiral portion of the groove.

The body of the pin at its head portion is rounded, so that it readily passes along the spiral portion of the groove and the diameter of the rounded portion is slightly less than the width of the face of the spiral portion of the groove. The shank 46 of the pin is square and engages in a square aperture in the slide 33, so that the pin is non-rotatable and the lug 42 always seats under the overhanging edge 41 when the pin is seated in the groove, thereby positively locking the pin in the spiral portion of the groove. The bottom of the straight portion ($31^b$, $32^b$) of the groove is eccentric to the axis of the cam and terminates at the surface of the cam, and as the pin rides up on this eccentric portion it is expelled from the groove. The body portion of the pin is provided with a beveled notch 47, which is adapted to be engaged by a beveled spring-pressed latch 48 arranged within the slide 33. As the pin is expelled from the groove, the latch 48 moves into the notch 47, drawing the pin to its seat in the slide and locking it in such position. Since the intake or entrance portions $31^a$, $32^a$, of the groove are arranged adjacent each other at the center of the cam, the means for moving the pins into the grooves need only be arranged at that place. Arranged at this place is a fixed plate 23 having a plurality of spring-pressed pins $35^a$, $36^a$, $37^a$ and $38^a$, arranged therein and formed to respectively engage the pins 35, 36, 37, and 38, when those pins lie at the center of the cam. The body portions of the pins lie in one plane, and their inner ends lie in the plane of the pins in the slide. For this reason pins $36^a$ and $38^a$ are bent down on their inner ends and are also bent sidewise to bring their ends into alinement with the pins 36 and 38. The plate 23 is provided with a plurality of slots, in each of which one pin is disposed and the pins in the plate are moved forward to move the pins in the slide into the cam groove by means of a lever 49 pivoted at 51 to some fixed structure. The pivot 51 is arranged parallel to the side 33 so that the lever may be rocked to move the pins into the grooves, and the lever is jointed at 52, so that its upper portion may be rocked to bring it into alinement with either of the pins $35^a$, $36^a$, $37^a$ or $38^a$. The upper portion of the lever 49 is preferably held upright at the joint 52 by flat springs 53 secured to the lower portion 54 of the lever and bearing against the upper portion. The lever is returned to its normal backward position, away from contact with the pins, by the spring 55 bearing against the fixed frame 34. It is understood that any other suitable means may be employed for moving the pins into the grooves.

Means are also employed for locking the slide against movement when it is not being shifted by the cam and for releasing the slide prior to the insertion of a pin in a groove. Pivotally attached to the frame 34 is a bent lever 56 which is loosely pivoted at one end to the lower portion 54 of the lever. The other end of the lever 56 is adapted to seat in cavities or depressions 57 in the slide, there being one cavity for each position of the slide. As the lever 49 is moved toward a pin, the lever 56 is rocked on its pivot and withdrawn from the depression before the pin is moved into the groove, and the lever 49 being released, the lever 56 drops into the approaching cavity 57 when it becomes alined therewith.

In Figs. 9 and 10 I have shown a modified form of cam which is shown in connection with a modified form of variable speed gearing. In this modified construction, the composite gear comprises a plurality of concentric gears 101—102—103, of different diameters, which are spaced apart by eccentric gears 104—105 of different diameters. The eccentric gears 104 and 105 are coincident at different portions of their perimeters with the perimeters of the concentric gears, that is, the teeth of gear 104 are alined at one portion with the teeth on gear 101 and at another portion with the teeth on gear 102 and the teeth on gear 105 are alined at one portion with the teeth on gear 102 and at another portion with the teeth on gear 103. Between these coincident or concentric portions, the eccentric gear has two eccentric portions which connect the concentric portions of its perimeter, one rising from the smaller gear to the larger and one falling from the larger gear to the smaller. The intermediate gear 14 is moved longitudinally of the axis of the composite gear at the zones of coincidence of the eccentric and concentric gears, both from the concentric to the eccentric gear and from the eccentric to the concentric gear. The shaft 15, upon which is mounted the gear 14 and its groove hub 25, is supported in the arms 106, which are rotatably mounted on shaft 17. Rotatably secured to the hub 25 is an arm 107 which is mounted on the sleeve 100 arranged on the shaft 17, which arm operates to move the gear 14 longitudinally in time with the sleeve.

Secured to the sleeve 5 is a cam 108, which serves to hold the gear 14 in mesh with the composite gear and also to move gear 14 to the left, the cam being arranged to move the gear 14 from one concentric gear over the intermediate eccentric gear, to the next concentric gear in and at the proper time. The cam has two concentric portions separated by an eccentric portion, the parts being arranged in the same relation as the concentric and eccentric gears on the composite gear. Formed in the face of the cam is an undercut groove 109, progressing toward the left and having straight and helical portions to effect the proper longitudinal movement of the gear 14. Mounted on sleeve 100 and secured to arm 107 is an arm having two fingers 112—113, the ends of the fingers being spaced apart a distance equal to the distance between the center lines of two successive concentric gears, and the finger 113 being depressed below finger 112 for reasons which will hereinafter appear. In the end of each finger is a pin 114—115, of the same construction and mounting as the pins 35, etc., in slide 33. When pin 114 is moved into groove 109, the rotation of the cam causes gear 14 to be moved from gear 101, over gear 104 to gear 102. The groove 109 has the same overhanging ledge as groove 31, so that the pin is locked in the groove, and the bottom of the groove at its termination slopes outward to the surface of the cam, so that the pin is ejected from the groove, and is also provided with a guard plate which prevents the improper entrance of the pin. The movement of the gear 14 to gear 102 brings the pin 115 in finger 113 into alinement therewith, and the movement of the gear 14 from gear 102 to gear 103 is effected by moving the pin 115 into the groove. When the gear 14 is in engagement with gear 102, it is elevated over the position that it occupied when in mesh with gear 101 and this elevating movement correspondingly elevates the finger 113, so that such finger must be depressed below finger 112. The fingers 112—113 contact with cam 108 on the opposite side of the axis to which gear 14 is disposed, so that should there be any tendency to move gear 14 transversely out of mesh, such movement will be prevented by the fingers contacting with the face of the cam 108. Since the gear 14 is in a different position with relation to a horizontal plane through the axis of the composite gear when in mesh with gears 101 and 102, the zone of coincidence of the concentric and eccentric gears will reach the gear 14 later, relatively speaking, when it is in mesh with gear 102 than when it is in mesh with gear 101. In order to effect the proper movement of gear 14, therefore, from gear 102, the pin 115 is advanced so that it will, relatively speaking, engage the helical portion of the groove 109 sooner than pin 114.

In effecting the longitudinal movement of gear 14, the cam 108 operates only to move the gear 14 from right to left, and the cam 116, secured to sleeve 5, is employed for moving the gear 14 from left to right. The cam 116 is provided with a groove 117, of the same construction as groove 31, which has straight and helical portions corresponding to the required movement of gear 14, and is also provided with a guard plate for preventing the improper entrance of the pin. The groove in cam 116 has a straight portion inserted at the center of its helical portion whereby the gear 14 is held against longitudinal movement while it is traveling over the eccentric portion of the gear 104 or 105, but the base of this straight portion is not eccentric to the axis of the cam as are the bases of the end straight portions. This formation of the cam is necessary to properly advance the gear 14. Arranged adjacent cam 116 is a slide 118, in which are mounted pins 121—122, which are adapted to be moved into groove 117 and which are of the same construction and arrangement as pins 35 and 36 in slide 33. The pins are placed at different levels for the same reason as pins 114—115. The slide 118 is connected to sleeve 100 in such manner that the movement of the slide produces a longitudinal movement of the gear 14. When gear 14 is in mesh with gear 103, pin 122 is alined with the intake end of groove 117 and when the pin is moved into the groove, the gear is moved to gear 102 and pin 121 becomes alined with the intake portion of the groove.

For the sake of convenience in operation, I have provided one lever 123 for operating the pins 114—115—121—122. The lever is arranged adjacent slide 118 at the intake end of groove 117 and is mounted on a fixed bracket 124 and is provided with a transverse joint 125, so that it may be moved sidewise and back and forth. Mounted on the bracket 124 is a lever 126 having its upper end lying in the path of the lever when it is moved to one side, the pin 121 or 122 lying in its path when it is moved to the other side. Loosely connected to lever 126 is a lever 127 secured to a shaft 128, journaled in a fixed bracket 129. The shaft 128 extends longitudinally to the intake side of groove 109, and at that point an arm 130 is secured thereto, the arm having a broadened head 131 so that it may engage the pin 114—115 which is in position to be moved into the slot.

I claim:

1. In combination, a cam, parts movable into and out of connection with said cam during the movement thereof, and coöperating with said cam, and means for preventing said coöperating parts from being placed in connection with said cam except at the proper place.

2. In combination, a cam having a groove therein, a portion of which is inclined and a portion of which is straight, an element adapted to be moved into said groove and to be moved by engagement therewith, and means for preventing the movement of the element into the groove at such point that it will not be properly seated in the groove before it engages the inclined portion.

3. In combination, a cam having straight and inclined portions, coöperating mechanism adapted to be moved into engagement with said cam, and means for preventing the movement of said mechanism into engagement with the cam at such point that it will not be properly engaged before it engages the inclined portion.

4. In combination, a cam having straight and inclined portions, coöperating means adapted to be moved into and out of engagement with said cam, and means for insuring the proper engagement of said means with the cam.

5. In combination, a cam having a groove therein, a portion of which is straight and a portion of which is inclined, an element adapted to be moved into engagement with said groove and a guard plate overlying the straight portion of the groove at its juncture with the inclined portion.

6. In combination, a cam having a groove therein, a portion of which is straight and a portion of which is inclined, a pin adapted to be moved into said groove, and a movable guard plate overlying the straight portion of the groove at its juncture with the inclined portion.

7. In combination, a cam having a groove therein, a portion of which is straight and a portion of which is inclined, a pin adapted to be moved into said groove, and a pivoted, spring-pressed guard plate overlying the straight portion of the groove at its juncture with the inclined portion.

8. In combination, a cam having a groove therein composed of entering and actuating portions, a pin adapted to be moved into coöperative relation with said groove, and means for insuring the seating of the pin in the entering portion before it is engaged by the actuating portion.

9. In combination, a cam having a groove therein having a straight entering portion and an inclined actuating portion and a shoulder overhanging the actuating portion.

10. In combination, a cam having a groove therein having a straight entering portion and an inclined actuating portion, a pin adapted to be moved into the groove at the entering portion and means for locking the pin in the groove at the actuating portion.

11. In combination, a cylindrical cam having a peripheral groove therein having straight and inclined portions, a shoulder overhanging the inclined portions, a pin adapted to be moved into the groove at the straight portion and a lug on said pin arranged to pass below the overhanging shoulder.

12. In combination, a shifting cam having a groove, a portion of which is helical, the end portions being straightened and terminating eccentrically at the surface of the cam, in combination with a coöperating pin standing in position for operatively engaging the cam, but normally out of engagement therewith, means for setting the pin to engage the cam, and means on the cam for preventing the engagement of the pin except at the proper time to insure its seating in the groove before it is engaged by the helical portion of the groove.

13. In combination, a cam having a plurality of oppositely directed helical grooves therein terminating in straight portions, said grooves being entirely separate from each other, and pins adapted to engage in said grooves.

14. In combination, a rotatable cam having grooves therein, a slide arranged adjacent said cam, pins in said slide adapted to be moved into engagement with said grooves, means for locking the slide against movement and a unitary means for unlocking said slide and moving one of said pins into the corresponding groove.

15. In combination, a cam having a groove, the central portion of said groove being angularly arranged with relation to the axis of the cam, and the end portions of the groove being parallel to a plane perpendicular to the axis of the cam and terminating eccentrically and at the circumference of the cam, and a shoulder overlying the angularly-disposed portion of the groove.

16. In combination, a cam having a groove therein, a slide arranged adjacent said cam, a pin in said slide adapted to be moved into said groove, means for locking the pin in the slide, means for moving the pin into the groove, and means for locking the pin in the groove.

17. In combination, a cam having a groove therein, a slide arranged adjacent said cam, a pin in said slide adapted to be moved into said groove, means for locking the slide, means for simultaneously unlocking the slide and moving the pin into the groove, and means for locking the pin in the groove.

18. In combination, a cam having a groove therein, a slide arranged adjacent said cam, a pin in said slide adapted to be moved into said groove, a second pin spaced from and axially alined with said first pin and means for sliding the second pin longitudinally for moving the first pin into the groove.

19. In combination, a cam having a groove therein, a slide arranged adjacent said cam, spaced pins in said slide adapted to be separately moved into said groove, a fixed plate arranged adjacent the intake end of the groove, a plurality of pins slidably mounted on said plate and arranged to be respectively alined with the slide pins when these pins are at the intake of the groove and means for moving a pin in said plate to move the corresponding slide pin into the groove.

20. In combination, a cam having a plurality of oppositely-directed grooves therein terminating adjacent the center of the cam, a slide arranged adjacent the cam, pins in the slide adapted to be moved separately into said grooves at the center of the cam, a fixed plate arranged adjacent the slide at the center of the cam, a plurality of pins in said plate arranged to be respectively alined with the slide pins when the slide pins are at the center of the cam, and means for moving a pin in said plate to move the corresponding slide pin into a cam groove.

21. In combination, a cam having a plurality of oppositely-directed helical grooves therein, a slide arranged adjacent said cam, pins in said slides arranged to be moved separately into said grooves and selective means for moving the proper pin into the proper groove.

In testimony whereof I have hereunto set my hand at San Francisco, California, this 1st day of May, 1917.

JAMES ARNOTT.

In presence of—
H. G. PROST.